United States Patent [19]

Teilhet

[11] 4,333,077
[45] Jun. 1, 1982

[54] DEVICE FOR DISTANCE ACQUISITION IN A RADAR SYSTEM

[75] Inventor: Michel Teilhet, Paris, France
[73] Assignee: Thomson-CSF, Paris, France
[21] Appl. No.: 158,793
[22] Filed: Jun. 12, 1980
[30] Foreign Application Priority Data
Jun. 13, 1979 [FR] France ............................... 79 15138
[51] Int. Cl.³ .................................................. G01S 13/86
[52] U.S. Cl. ................................ 343/6 R; 343/6 ND; 343/6 TV
[58] Field of Search ................. 343/6 R, 6 ND, 6 TV
[56] References Cited

U.S. PATENT DOCUMENTS 3,108,270  10/1963  Fairbanks ........................ 343/6 ND
3,242,485   3/1966  Astheimer ....................... 343/6 ND
3,754,249   8/1973  Kearney ............................ 343/6 R
4,050,068   9/1977  Berg et al. .......................... 343/6 R
4,157,544   6/1979  Nichols ........................... 343/6 R X Primary Examiner—T. H. Tubbesing
Attorney, Agent, or Firm—Karl F. Ross

[57] ABSTRACT

A device for distance acquisition in a radar system, especially a tracking system, comprises a surveillance radar with a mobile directional antenna whose direction is known at each instant, a tracking unit whose line of sight is also known at each instant, and a video extractor. The device further comprises means for detecting the coincidence of the direction of the surveillance antenna with the direction of the line of sight of the tracking unit as well as means for permitting measurement of the distance of a tracked echo-emitting target by the surveillance signals at the time of such coincidence.

8 Claims, 4 Drawing Figures

FIG_1

DEVICE FOR DISTANCE ACQUISITION IN A RADAR SYSTEM

FIELD OF THE INVENTION

My present invention relates to a range-acquisition device in a radar system and especially in a tracking system. In more precise terms, the invention applies either to a tracking radar which is incapable of determining the range or distance of the target because its telemetering system is jammed or does not exist, or to an angular-tracking unit of the passive optoelectronic type such as a television or infrared camera (the optoelectronic unit may be mounted on the same turret as the radar unit), or to a laser system which does not give any indication of the target distance.

BACKGROUND OF THE INVENTION

As a general rule, units of this type (radar or optoelectronic systems) are coupled to a surveillance radar whose function is to acquire the target or targets and then to transfer the designation data from a target to a tracking radar. When the surveillance unit is a radar system, the target-designation data delivered by this system are the azimuth angle and the target distance or range. When the surveillance unit consists of passive optoelectronic means such as a television or infrared camera, the target-designation data are the azimuth angle and the elevation angle. In the ensuing description of my present invention, consideration will be given only to surveillance radar systems which give the target distance and are equipped with antennas of the mobile directional type.

The tracking unit can also be an optoelectronic device of either the passive or the active type (which is the case of a laser) or alternatively a radar system.

With a passive unit it is not possible to obtain an accurate measurement of the distance or range of the target, which is a major drawback. In the case of an active tracking system, this system is liable to be jammed, in particular by a detection jammer of the telemetry-thief type. It becomes impossible in such a case to determine the target distance with accuracy and therefore to determine the course or variations in trajectory of the target.

OBJECT OF THE INVENTION

One of the aims of the invention is to provide means enabling an accurate measurement of the target distance when the tracking system is of the passive optoelectronic type. Should the tracking system consist of a radar unit, the invention has the object of preventing jamming of that unit by facilitating a redundant measurement of the target distance.

In accordance with one distinctive feature of the invention, the device for acquisition of the target distance in a radar system—constituted by a surveillance radar equipped with a mobile directional antenna whose direction is known at each instant, a tracking unit whose line of sight is also known at each instant, and a video extractor—comprises means for ascertaining a coincidence of the direction of the surveillance antenna with the line of sight of the tracking system and enabling means for permitting measurement of the distance of an echo-emitting target by surveillance signals upon the establishment of such a coincidence.

BRIEF DESCRIPTION OF THE DRAWING

The above and other features of the invention will be more apparent upon consideration of the following description and the accompanying drawing, wherein.

SPECIFIC DESCRIPTION

Figure 1:
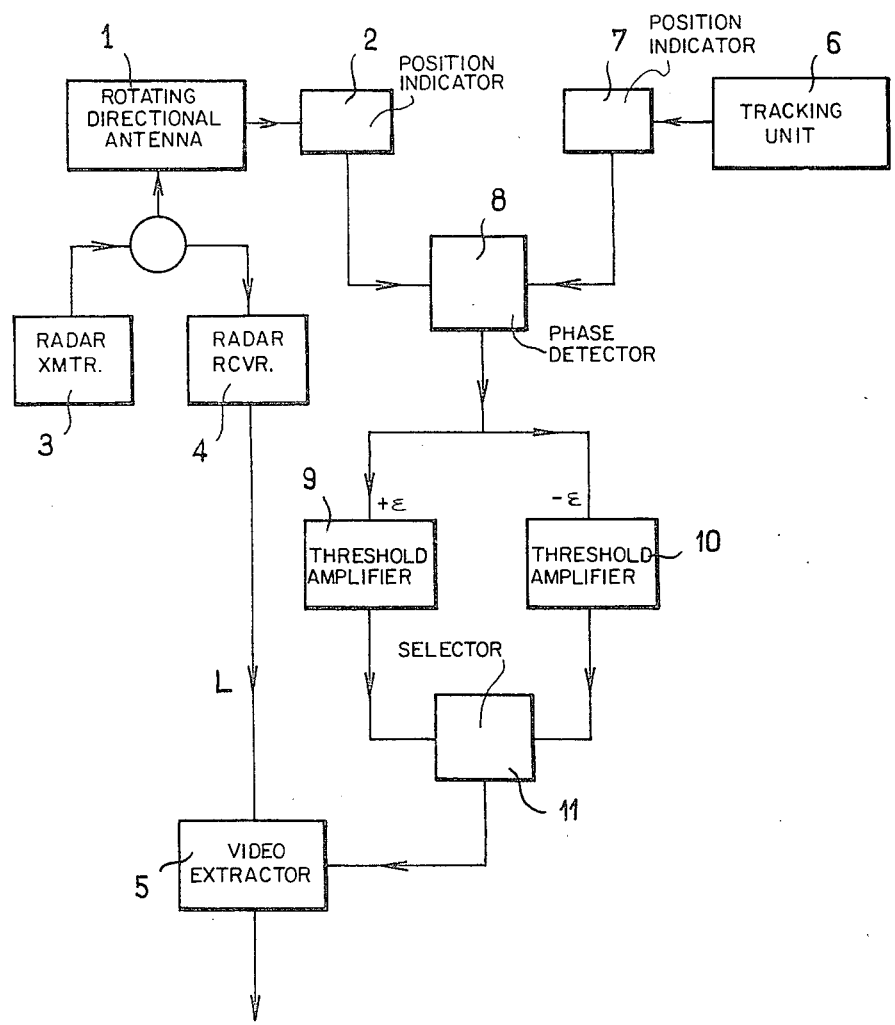
FIG. 1 is a block diagram of a device embodying my invention.

The radar system shown in the block diagram of FIG. 1 is composed of a conventional surveillance radar and of a tracking unit. The surveillance radar comprises a mobile directional antenna 1 whose direction is indicated at each instant by a synchrotransmitter or a digital coder 2. Detection of any target in the direction of the antenna is performed on the basis of signals produced by a radar transmitter 3 and of the echoes arriving at an associated receiver 4. The output of the receiver is connected by a line L to the input of a video extractor 5 which makes it possible at each instant to measure the distance of an echo-emitting target with the aid of these surveillance signals. This measurement of distance can be performed over the entire range or only within a distance-selection "window" which permits measurement only within a predetermined zone if it is desired to reduce the possibilities of "false alarm" on parasitic close echoes. Should it also prove necessary to limit the detection of radar noise, a video-detection threshold can be chosen. In accordance with conventional procedure, the echoes received by the antenna are directed by the extractor 5 to a nonillustrated panoramic display screen, for example. By manual or automatic control means, the tracking system is adjusted to the indicated azimuth angle. The direction of the line of sight of the tracking unit 6 is indicated at each instant by a synchrodetector or a digital coder 7. Thus, the two synchro-mechanisms or digital coders 2 and 7, acting as position indicators, enable the detection of the passage of the surveillance antenna through the same azimuth as the tracking-system antenna. To this end, the output signal of indicator 2, which gives the position in azimuth of the surveillance antenna, and the output signal of indicator 7 are transmitted to respective inputs of a phase detector 8.

Figure 2:
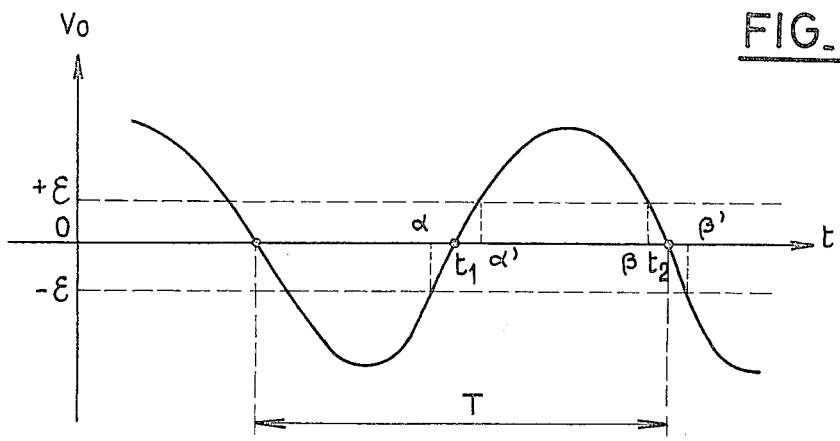
FIG. 2 is a diagram showing an output waveform of the signal of the phase detector of a device of FIG. 1.
Figure 3:
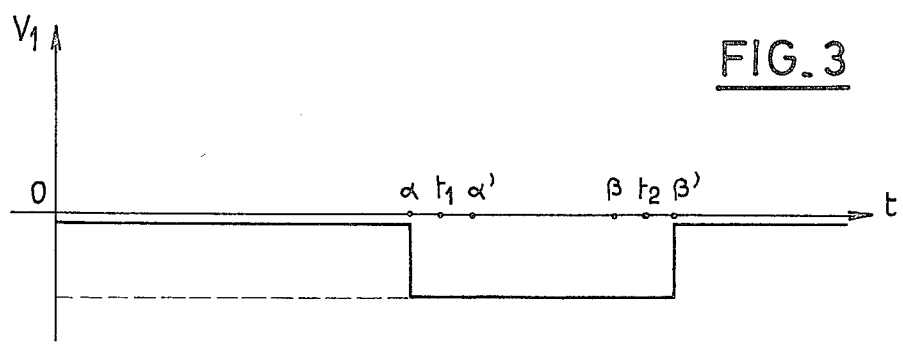
FIGS. 3 and 4 are diagrams showing the waveform of output signals of two threshold amplifiers included in the device of FIG. 1.

FIG. 2 shows the waveform of the signal delivered by the phase detector in the form of a time-varying output voltage $V_0$. At the instant $t_1$, the surveillance antenna 1 points in the same direction as the line of sight of the tracking antenna whereas the two directions are located at an angle of 180° with respect to each other at the instant $t_2$. The period T of the sinusoidal signal $V_0$ is equal to the period of rotation of the surveillance antenna 1. At instants $\alpha$, $\alpha'$, $\beta$ and $\beta'$ the surveillance antenna 1 points in the same direction as or in a direction opposite to that of the line of sight with a degree error corresponding to a voltage error of $\pm\epsilon$. The output of the phase detector 8 is applied to the inputs of two threshold amplifiers ($-\epsilon$ and $+\epsilon$) 9 and 10. The signal $V_1$ at the output of the amplifier 9 is shown in FIG. 3. At the instant $\alpha$, at which the surveillance antenna 1 points in the direction of the line of sight of unit 6 with a degree error corresponding to a voltage deviation $-\epsilon$, the voltage $V_1$ changes from 0 to a negative value up to the instant $\beta'$ at which the curve again passes through the value $\epsilon$.

Figure 4:
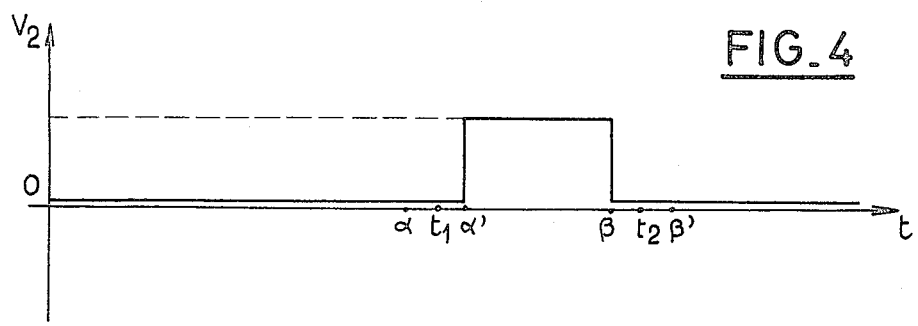

The signal $V_2$ at the output of the threshold amplifier 10 is shown in FIG. 4. At the instant at which the surveillance antenna passes through the same direction as that of the line of sight to within a tolerance of $+\epsilon$, the output voltage of the amplfier passes from 0 to a positive value up to the instant $\beta$ when it falls back to zero. The outputs of the two amplifiers 9 and 10 are connected to a selector 11 which will be open on the negative wavefront of the signal $V_1$ and closed on the positive wavefront of the signal $V_2$. This selection permits measurement of the distance by the extractor, with the result that this measurement takes place only during the square-topped enabling pulse produced by the selector. As soon as the selector gives the permission by sending an enabling signal to extractor 5, it is possible, for example, to release a chronometer at the instant of emission of a signal by the transmitter 3 of the surveillance radar, the chronometer being stopped when an echo appears in the output of the receiver 4; the elapsed time interval is a measure of the distance between the surveillance transmitter and the echo source. When the tracking system is of the passive optoelectronic type such as a television or infrared camera, there is thus obtained a means for measuring the distance of an echo-enabling target by surveillance signals. When tracking is carried out by means of a radar unit, the invention affords anti-jamming protection by redundant measurement.

The device in accordance with the invention can also comprise a video extractor associated with the tracking radar whereby the target distance can be measured at each instant by means of the tracking signals. The invention accordingly serves to overcome jamming of the tracking radar by carrying out a measurement of the distance.

What is claimed is:

1. A device for range acquisition in a radar system constituted by a surveillance radar equipped with a mobile directional antenna rotating continually around an axis and with first indicating means for giving the direction of said antenna at each instant, a tracking unit provided with second indicating means for giving the direction of a line of sight thereof, and a video extractor, said device comprising:

detecting means controlled by said first and second indicating means for ascertaining a coincidence of the direction of said mobile antenna with the direction of the line of sight of said tracking unit, and enabling means controlling said extractor in response to signals from said detecting means for initiating measurement of the distance of a tracked echo-emitting target by surveillance signals upon an occurrence of said coincidence.

2. A range-acquisition device according to claim 1 wherein said tracking unit is of the passive optoelectronic type.

3. A range-acquisition device according to claim 1 wherein said tracking unit is of the active optoelectronic type.

4. A range-acquisition device according to claim 1 wherein said tracking unit is a radar.

5. A range-acquisition device according to claim 1 wherein said first and second indicating means are synchro-mechanisms.

6. A range-acquisition device according to claim 1 wherein said first and second indicating means are digital coders.

7. A range-acquisition device according to claim 1 wherein said detecting means comprises a phase detector connected to the outputs of said first and second indicating means for delivering to said enabling means a sine-wave signal having a period equal to the period of rotation of said mobile antenna.

8. A range-acquisition device according to claim 7 wherein said enabling means comprises:

a first amplifier having a positive threshold $(+\epsilon)$ whose input is connected to the output of the phase detector, said first amplifier delivering a negative rectangular signal;

a second amplifier having a negative threshold $(-\epsilon)$ whose input is connected to the output of the phase detector, said second amplifier delivering a positive rectangular signal; and a selector whose input is connected to the outputs of said first and second amplifiers and whose output signal initiates the measurement of distance by the extractor.

* * * * *